Patented Nov. 15, 1949

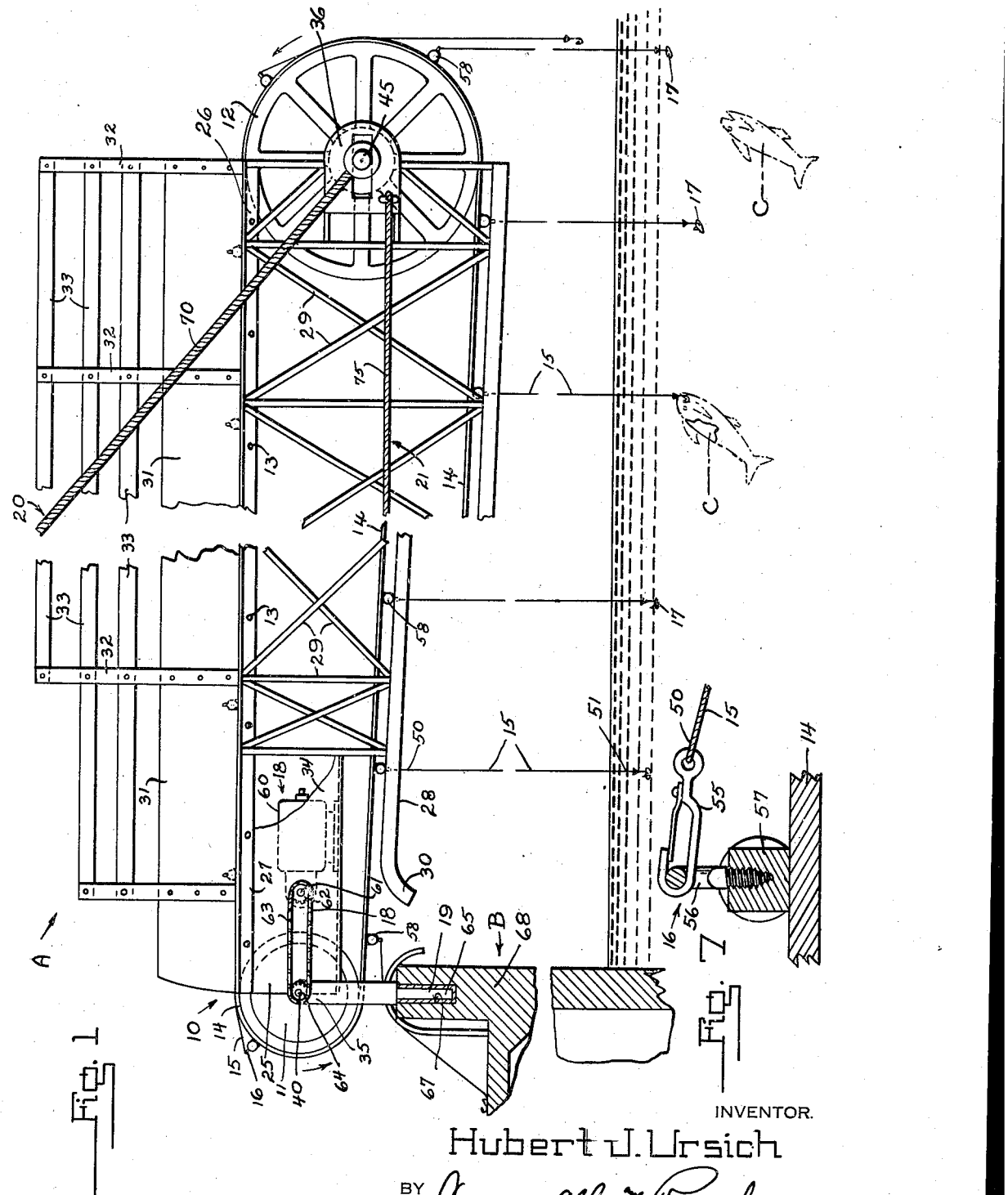

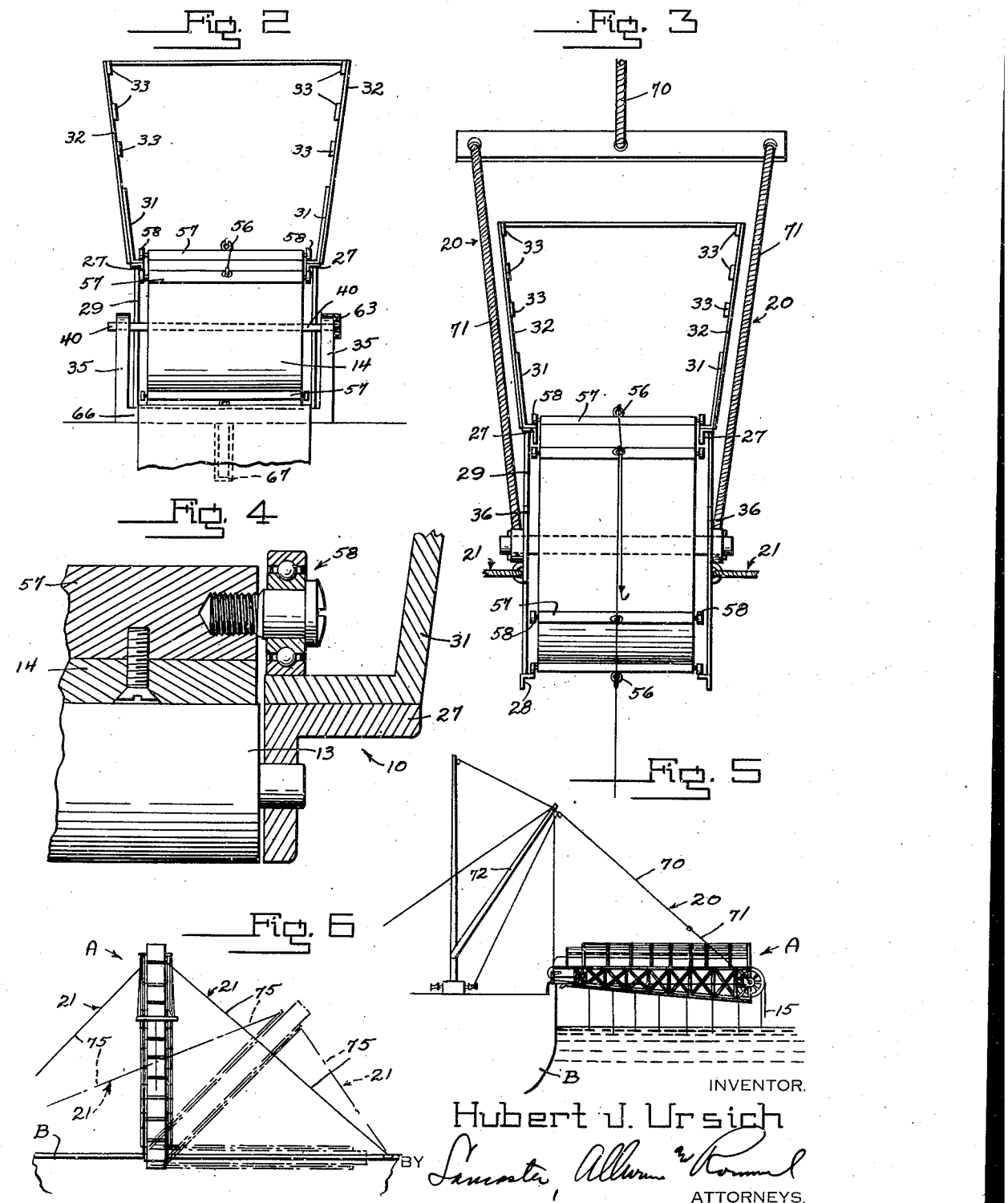

2,488,451

UNITED STATES PATENT OFFICE 2,488,451

FISHING APPARATUS

Hubert J. Ursich, Tacoma, Wash.

Application June 25, 1948, Serial No. 35,156

9 Claims. (Cl. 43—4)

This invention relates to fishing and more particularly to commercial fishing apparatus. An example of the use of the new apparatus is catching fish which are normally caught near or at the surface of the water, such as tuna, yellowtail and albacore, and conveying the fish to the boat.

In the present generally-practiced method of commercial fishing, the crew members stand in racks, or platforms, slung over the side of the boat. They use hand poles, and when fish are hooked, they throw them over their shoulders, onto the deck. In the case of a large fish, of a hundred pounds, for example, an adjacent crewman drops his gear and helps to land the fish. In the case of a two-hundred or three-hundred pound fish, several men are needed to boat the fish.

An important object of the invention is to provide a new fishing apparatus whereby fish of any size, after being hooked, may be brought to the deck without such manual aid.

The present limit to the distance from a hull in which a hand pole may be employed is substantially eleven feet. Moreover, it is well known that many fish will bite less readily when swimming near the hull.

Another important object is to provide an apparatus whereby fishing may be carried on at distances from the hull considerably in excess of eleven feet.

During rough weather, very often the crewmen can not fish on the racks, because of the danger of being washed overboard.

A further important object of the invention is to provide an apparatus which may be fished on in substantially all kinds of weather.

In pole fishing as described, there is a constant hazard that crewmen may be injured by flying hooks when a fish is slung overhead onto the deck, or injured when a shark is hooked and flung onto the deck since it may strike a crewman or injure him when the hook is being removed.

Another object of the invention is to eliminate this since, by the use of the novel apparatus herein disclosed, the hooks or fish are not flung so as to become hazards and in the event a shark is hooked, the leader may be readily uncoupled from the apparatus and the former, with the hook, removed after the shark is dead.

A further important object is to improve the effective fishing time and increase the catch by keeping a plurality of hooks in the water continuously. That is, at any given time, there will be a plurality of hooks in the water as fish are being unhooked and replacements are being made on deck.

Other objects and advantages of the invention will be apparent during the course of the following detailed description of the invention, taken in connection with the accompanying drawings, forming a part of the disclosure, and in which drawings:

Figure 1 is a side elevation of the outboard and inboard portions of the novel apparatus, pivotally coupled to a boat, shown in fragmentary section.

Figure 2 is a rear or inboard elevation of the new apparatus.

Figure 3 is a front or outboard elevation thereof.

Figure 4 is an enlarged fragmentary vertical transverse section of the novel apparatus.

Figure 5 is a side elevation of the entire apparatus, coupled to a boat and in a fishing position.

Figure 6 is a top plan view thereof, with the new apparatus disposed, in full lines, substantially normal to the longitudinal axis of the boat and, in dots and dashes, in two other positions with respect to this axis.

Figure 7 is an enlarged vertical section of a portion of a means to detachably secure a leader to the novel apparatus.

In the drawings, wherein for the purpose of illustration is shown a preferred embodiment of the invention and wherein similar reference characters designate corresponding parts throughout the several views, the letter A designates the novel apparatus, the letter B, a carrier (such as a boat) to which the apparatus A may be secured, and C, fish caught by the new apparatus.

The apparatus A comprises a support 10, a rotor 11, a second rotor 12 and a plurality of rollers 13 carried by the support 10, a member 14 trained over the rotors, a plurality of leaders 15, means 16 to secure the leaders 15 at one end of each, to the member 14 at spaced-apart intervals, a plurality of lures 17 carried by the leaders 15, means 18 to rotate one of the rotors, means 19 to attach one end of the support 10 to the carrier B, means 20 to suspend the support 10 over the water, and means 21 to guy the support 10 in various selected positions.

Referring first to the support 10, this is, preferably, an elongated truss or frame having an inboard or rear end 25 and an outboard or forward end 26. The truss or frame includes a pair of upper side members 27 which may be of angle iron construction normally disposed substantially horizontally and in spaced parallel relationship, a pair of lower side members 28, which are disposed so that they are associated with and disposed beneath the members 27 and each associated member 27 and 28 diverge from the inboard end 25 of the support 10. Each associate member 27 and 28 is secured together by suitable cross members 29 and any preferred cross members may be provided to secure the two members 27 and 28 together in spaced-apart relationship. Preferably, the inboard end portions 30 of the members 28 are curved downwardly for a purpose later detailed.

A superstructure may form part of the support 10 and comprises substantially parallel side panels 31 secured to and extending upwardly and outwardly from the members 27 and extending longitudinally of the member 27 from the end 25 to the end 26 of the truss, and to which panels are secured spaced-apart upstanding guard posts 32 supporting spaced-apart horizontally-extending guard rails 33.

The support 10 may also include a suitable housing 34 for the means 18, preferably disposed between the two runs of the member 14 at the end 25 of the support 10 and including side walls carried in part by the members 27.

There is also provided bearings 35 for the rotor 11 and bearings 36 for the rotor 12, with the bearings 36 carried by the support 10, as by some of the cross members 29, altho as will be hereinafter described, the bearings 35 are preferably supported by the means 19 to be described.

The rotor 11 is preferably a cylinder and has a substantially horizontally-disposed shaft 40 extending through the walls of the housing 34 and carried by the bearings 35 and positioned at the inboard end 25 of the support 10.

At the outboard end 26 of the support 10 is disposed the rotor 12 which is preferably a cylinder of greater diameter than the cylindrical rotor 11 and is provided with a substantially horizontally-disposed shaft 45 carried by bearings 36.

Any suitable number of spaced-apart rollers 13 may be provided journalled, as shown in Figure 4, in the members 27 and which support the upper run of the member 14.

The member 14 is, preferably, a belt of suitable flexible material, resistant to salt water, and is, of course, endless.

Any suitable leaders 15 may be provided, their length being such that, when the novel apparatus A is disposed, as in Figure 1, the leaders will extend from the lower run of the member 14 into the water a sufficient distance. Each has an upper attachable end 50 and lower free end 51.

The means 16 to secure the leaders 15 to the member 14 is, preferably, detachable means and shown as a snap hook 55 secured to the end 50 of the leader, which may be snapped around an eyed member 56 extending from a cross member 57 secured to the outer face of the belt member 14. The means 16 is, of course, disposed in spaced-apart relationship longitudinally of the member 14 and the ends of the cross members 57 may be provided with suitable roller bearing assemblies 58 to roll over the adjacent horizontal portions of the support 10 as in Figure 4.

These cross members 57 not only provide means for attachment of the eyed members 56 but they also strengthen the belt and provide, with the belt itself and the adjacent side panels 31, a series of compartments to contain the hooked fish.

Any suitable lures 17 may be secured to the free ends 51 of leaders 15.

Means 18 to rotate one of the rotors may include a conventional variable-speed, reversible electric motor 60 within the housing 34 operatively connected with a shaft 61 journalled in a wall of the housing 34 carrying a sprocket 62 over which is trained a chain 63 which is also trained over a second sprocket 64 secured to the shaft 40 of the rotor 11. Any suitable conventional remote control of the motor 60 from the boat may be provided.

The means 19 to attach one end of the support 10 to the boat B may be a vertically-disposed pivot pin 65 carried by a horizontally disposed cross piece 66 to which the two bearings 35 are firmly secured and extend upwardly, providing a yoke. This pin 65 may be disposed within a suitably lined socket 67 which may extend into the boat rail 68. Thus, it may be seen that the support 10 may be swung into various positions with respect to the boat, as shown by way of example, in Figure 6.

It is also clear that since the support 10 is carried at one end by the yoke mentioned (which yoke, through the bearings 35 rotatably support the shaft 40), the entire support 10 may be raised or lowered, as desired, employing the shaft 40 as a pivot.

Means 20 to suspend the support 10 over the water, as shown in Figures 1 and 5, comprises a suitable main guyline 70 which may be secured to a pair of auxiliary guylines 71 attached to the bearings 36 and the guyline 70 extend to a conventional boom 72 carried by the carrier or boat B.

Means 21 to guy the support 10 in various selected positions with respect to the carrier B may be suitable guylines 75 also connected with the support 10, as secured to the bearings 36, and attached to the carrier B. Thus the support 10 may be retained, for example, in any of the several positions shown in Figure 6. This flexibility of movement of the apparatus A enables the crew, of a boat to which it is attached, to swing the apparatus alongside for raising it and stowing it on deck, or the apparatus may be swung into various positions inclined from the horizontal, even being swung into a nearly vertical position to dispose it out of the way.

With the leaders equipped with lures and the rotor 11 rotating anti-clockwise as in Figure 1, a crewman attaches the lures, one by one, as the eyed members 56 approach him and they travel over the side with the lures normally dropping into the water and moving through the water. As the leaders reach the vicinity of the outboard end 26 of the support 10 they rise, carrying the lures and hooked fish with them, and then travel toward the boat. As they approach the crewman he can (1) unhook the fish, (2) replace lost lures, (3) remove leaders attached to fish which cannot be readily removed therefrom, and (4) replace such removed leaders. This is possible since the crewman has an opportunity to see the situation along the upper run of the belt as the leaders approach him, the leaders reach him, one by one, in a regular progression and since the means 16 approaches him much before the catch or the empty lure, he can govern his actions according to the situation (for example, detach the leader at the proper time and before the means 16 to which it is attached has travelled away from him and out of his reach).

The various dangerous practices incidental to hand pole method of commercial fishing are eliminated by the use of the novel apparatus herein disclosed and, as pointed out, the apparatus is readily handled for stowing away, running out or swinging into various operating positions.

Various changes may be made to the form of the invention herein shown and described without departing from the spirit of the invention or scope of the claims.

What is claimed is:

1. In fishing apparatus for attachment to a carrier to extend over a body of water, an elongated support having an outboard end and an inboard end; a rotor at each end; a flexible, endless member trained over said rotors to rotate therewith; leaders; means securing said leaders, at one end of each and in spaced-apart relationship to the outer face of said member; a lure carried by the free end of each leader; means to rotate one of said rotors; means to attach said inboard end to a carrier to project outwardly therefrom over said body of water; and means to suspend said support over the body of water with some of said lures within the body of water.

2. In fishing apparatus for attachment to a carrier to extend over a body of water, an elongated support having an outboard end and an inboard end; a rotor at each end; a flexible, endless member trained over said rotors to rotate therewith; leaders; means securing said leaders, at one end of each and in spaced-apart relationship, to the outer face of said member; a lure carried by the free end of each leader; means to rotate one of said rotors; means to pivotally attach said inboard end to a carrier to project outwardly therefrom over said body of water; and means to suspend said support over the body of water with some of said lures within the body of water.

3. In fishing apparatus for attachment to a carrier to extend over a body of water, an elongated support having an outboard end and an inboard end; a plurality of spaced-apart leaders; a lure for each leader; means carried by said support to convey said leaders from said inboard end to said outboard end with said lures extending into said body of water and to convey said leaders from said outboard end to said inboard end with said lures spaced above the body of water; means to attach said inboard end to a carrier to project outwardly therefrom over said body of water; and means to suspend said support over the body of water with some of said lures within the body of water.

4. In combination with a boat provided with a boom and floating in a body of water, an elongated support having an outboard end and an inboard end; a plurality of spaced-apart leaders; a lure for each leader; and means carried by said support to convey said leaders from said inboard end to said outboard end with said lures extending into said body of water and to convey said leaders from said outboard end to said inboard end with said lures spaced above the body of water, including a guyline extending from said outboard end to said boom.

5. In fishing apparatus for attachment to a carrier floating in a body of water, an elongated support having an inboard and an outboard end and upwardly extending side panels; a rotor at each end; a flexible endless belt trained over said rotors to rotate therewith; leaders; means for detachably securing said leaders to said belt including spaced-apart cross members secured to the outer face of said belt and extending transversely thereof to adjacent said side panels, eyed members secured to said cross members and a snap hook secured to one end of each of said leaders; lures at the other ends of said leaders; means to rotate one of said rotors; means to support the inboard end of said support on said carrier; and means to suspend said support over said body of water with the lures of the leaders of the lower run of said belt within said body of water.

6. In fishing apparatus for attachment to a carrier floating in a body of water, an elongated support having an inboard and an outboard end and upwardly extending side panels; a rotor at each end; a flexible endless belt trained over said rotors to rotate therewith; leaders; means for detachably securing said leaders to said belt including spaced-apart cross members secured to the outer face of said belt and extending transversely thereof to adjacent said side panels, eyed members secured to said cross members and a snap hook secured to one end of each of said leaders; lures at the other end of said leaders; means to rotate one of said rotors; means to pivotally support the inboard end of said support on said carrier; and means to suspend said support over said body of water with the lures of the leaders of the lower run of said belt within said body of water.

7. In fishing apparatus for attachment to a carrier floating in a body of water, an elongated support having an outboard end and an inboard end; a rotor for each end, each rotor having a shaft; bearings carried by said support for the shaft of the outboard rotor; means to attach said inboard end to said carrier including a cross member secured to said carrier and a pair of spaced-apart bearings fixedly secured to and extending upwardly from said cross members and rotatably supporting the shaft of the rotor at the inboard end; a flexible endless member trained over said rotors to rotate therewith; spaced-apart leaders carried by said endless member; lures carried by said leaders; means to rotate one of said rotors; and means to suspend said support over the body of water with some of said lures within the body of water.

8. In fishing apparatus for attachment to a carrier floating in a body of water; an elongated support having an outboard end and an inboard end; a rotor for each end, each rotor having a shaft; bearings carried by said support for the shaft of the outboard rotor; means to attach said inboard end to said carrier including a cross member pivotally carried by said carrier and a pair of spaced-apart bearings fixedly secured to and extending upwardly from said cross member and rotatably supporting the shaft of the rotor at the inboard end; a flexible endless member trained over said rotors to rotate therewith; spaced-apart leaders carried by said endless members; lures carried by said leaders; means to rotate one of said rotors; and means to suspend said support over the body of water with some of said lures within the body of water.

9. In fishing apparatus for attachment to a carrier floating in a body of water, an elongated support having an outboard end and an inboard end; a rotor for each end, each rotor having a shaft; bearings carried by said support for the shaft of the outboard rotor; means to attach said inboard end to said carrier including a cross member, a pivot secured to said cross member and extending into said carrier and a pair of spaced-apart bearings fixedly secured to and extending upwardly from said cross members and rotatably supporting the shaft of the rotor at the inboard end; a flexible endless member trained over said rotors to rotate therewith; spaced-apart leaders carried by said endless member; lures carried by said leaders; means to rotate one of said rotors; and means to suspend said support over the body of water with some of said lures within the body of water.

HUBERT J. URSICH.

REFERENCES CITED

The following references are of record in the file of this patent:

UNITED STATES PATENTS

| Number | Name | Date |
|---|---|---|
| 127,131 | Wolking | May 21, 1872 |
| 488,874 | Deniston | Dec. 27, 1892 |
| 578,248 | Layne | Mar. 2, 1897 |
| 1,486,485 | Frissell | Mar. 11, 1924 |